Oct. 11, 1938.  D. R. FARMEN  2,132,683
CAMERA ATTACHMENT
Filed Jan. 7, 1937

Donald R. Farmen
INVENTOR.

BY Newton M. Perrin
Rolla H. Carter
ATTORNEYS

//  Patented Oct. 11, 1938

2,132,683

UNITED STATES PATENT OFFICE 2,132,683

CAMERA ATTACHMENT

Donald R. Farmen, Rochester, N. Y., assignor to Eastman Kodak Company, Rochester, N. Y., a corporation of New Jersey Application January 7, 1937, Serial No. 119,481

5 Claims. (Cl. 95—81)

This invention relates to light filters of the type which polarize light. More particularly, it relates to polarizing filters for use on photographic cameras.

According to the wave theory of light propagation, ordinary light may be considered as vibrating in all directions perpendicular to its direction of propagation. For many years, it has been known that ordinary light on passing through a polarizer, such as a Nicol prism, becomes polarized with the planes of vibration of the emergent light, mutually parallel. The orientation of these planes of vibration is determined by the structure of the polarizer with respect to which there is thus a unique direction, which, for convenience in describing the invention, I call the "vibration axis" of the polarizer.

When using cameras of the type which permit ground glass focusing, it is a relatively simple matter to determine, by examining the image on the ground glass, the effect of rotating a polarizing filter in front of the camera lens. However, since all cameras are not so equipped, it is desirable to have an auxiliary polarizing filter through which the subject to be photographed may be examined. It is an object of this invention to provide a convenient means of mounting an auxiliary, view examiner, polarizing filter so that its vibration axis as defined above will be oriented parallel to the vibration axis of the polarizing filter which is used over the camera lens.

It is a particular object of this invention to provide a mount for an auxiliary polarizing filter which may be detachably secured to the indicator handle of the camera lens polarizing screen, in a manner which provides that the vibration axes or the two filters are parallel.

It is a particular object of this invention to provide an auxiliary polarizing filter for the above-mentioned purpose and which will be both convenient to carry and use and relatively inexpensive to manufacture.

Other objects and advantages of the present invention will be apparent from the following description when read in connection with the accompanying drawing in which:

Figure 1 is a perspective view of one form of the invention mounted on an amateur motion picture camera.

Figures 2, 3, and 4 are respectively an elevation, a vertical cross-section and a perspective view of a form of the invention similar to the one shown in Figure 1.

Figures 5, 6, and 7 are respectively an elevation, a vertical cross-section and a perspective view of one form of polarizing screen which may be used over a camera lens and for which the form of the invention shown in Figures 2, 3, and 4 is adapted.

Figure 1:
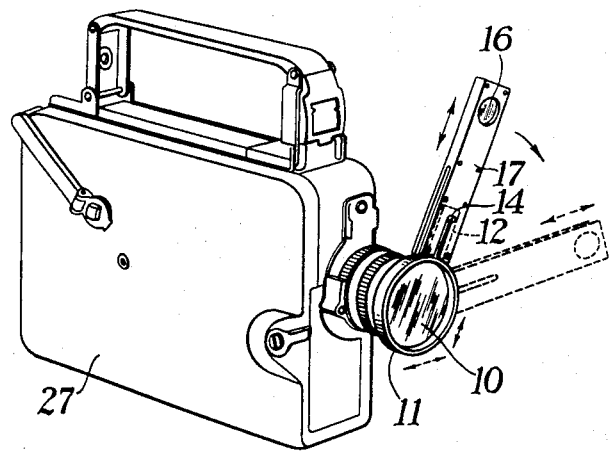

In Figure 1, a sheet polarizing screen 10 mounted in a ring 11 is rotatably attached to the lens of a motion picture camera 27. It is to be understood that this invention is equally applicable to still cameras and indeed is not restricted to use in any particular field of photography. The mount 11 for the polarizing screen 10 is provided with a handle 12 having a small post 14 projecting through it perpendicular to the polarizing material. The vibration axis of the polarizing screen 10 is indicated by a double pointed arrow nearby. An auxiliary polarizing filter 16 provided with a mount 17 is detachably mounted on the handle 12. The mount 17 constitutes a new handle for the polarizing filter 10. Using this handle 17, the polarizing screen 10 may be rotated to any new position such as that indicated by the broken lines. The new directions of the vibration axes of the polarizing screen 10 and the polarizing filter 16 are indicated by double headed arrows drawn of broken lines. The polarizing filter 10 carrying the mount 17 may be rotated through 360 degrees, if desired, but this is, of course, unnecessary, since rotation of 180 degrees includes all dissimilar orientations of the vibration axis of the polarizing filter possible in one plane.

Figure 2:
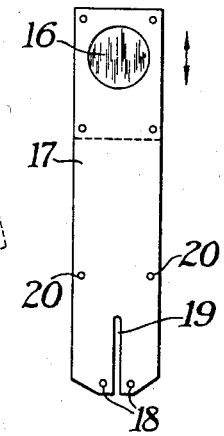
Figure 3:
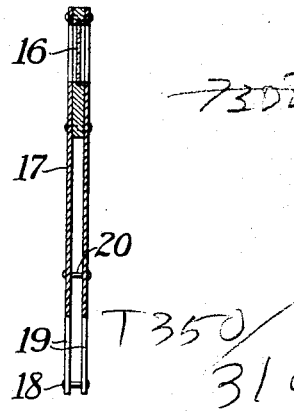
Figure 4:
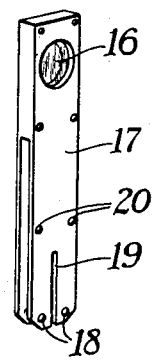

A form of this invention similar to that shown in Figure 1 is shown in detail in Figures 2, 3 and 4. The polarizing filter 16 is held between two parts of the mount 17 which are fastened together by rivets 18 and 20. The lower portion of the mount 17 comprises two plates which are spaced so as to fit over the indicator handle of the lens polarizing screen shown in Figure 5. A slot 19 is provided in each of these plates to accommodate a small post 14 which projects through this indicator handle. The orientation of the vibration axis of the polarizing filter 16 is indicated by a double pointed arrow between Figures 2 and 3.

Figure 5:
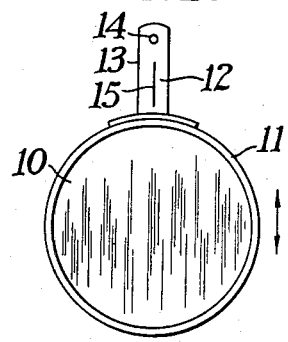
Figure 6:
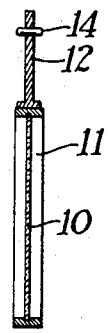
Figure 7:
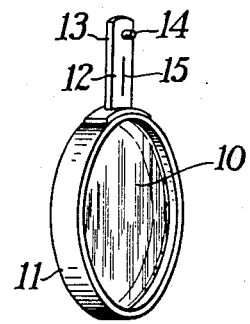

Figures 5, 6, and 7 show a polarizing filter 10 suitable for use within the form of the invention shown in Figure 2. The polarizing filter 10 mounted in a ring 11 is provided with a handle 12 whose sides 13 are parallel to the direction of the vibration axis which is oriented as indicated by the double pointed arrow between Figures 5 and 6. A small post 14 projects perpendicularly from both faces of the handle 12. An index line 15 is marked on the handle 12 and is useful for indicating the direction of the shadow of the post 14 with respect to the vibration axis of the polarizing filter 10, whereby the orientation of the camera and the filter with respect to the sun may be easily determined. The slot 19 shown in Figure 2 slips over the post 14 when the auxiliary viewing device (Figure 2) is attached to the polarizing filter (Figure 5). Also, the rivets 18 of the mount 17 are so arranged that they slide and fit snugly over the sides 13 of the indicator handle 12.

Figure 8:
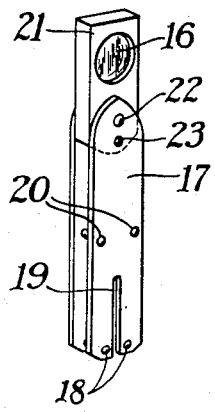
Figure 8 is a perspective view of another form of the invention in which the auxiliary polarizing filter material may be protected by the casing when not in use.

Figure 8 is another form of the invention somewhat similar to Figure 2. In this case, the polarizing filter 16 is mounted in a member 21 which is pivoted by a pivot 22 so that the polarizing filter 16 is protected by the mount 17 when the member 21 is rotated to its lowest position. When the member 21 is rotated to a vertical position so that the filter 16 is in its highest position, a small stud mounted on the member 21 snaps into a hole 23 in the mount 17. This insures correct orientation of the vibration axis of the polarizing filter 16 with respect to the mount 17 and, hence, with respect to the vibration axis of the lens polarizing screen 10. The stud on the mount 21 is small so that it snaps easily into and out of the hole 23.

Figure 9:
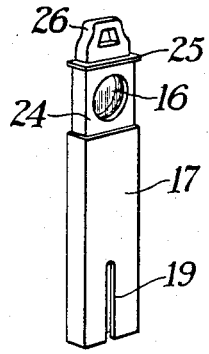
Figure 9 is a perspective view of another of the forms which the invention may take.

Figure 9 is another form of the invention in which the polarizing filter 16 may be protected by the mount 17 when not in use. In this case, the polarizing filter is mounted in a member 24 which is slidably arranged in the mount 17. The device is shown with the member 24 in the extended position ready for use as an auxiliary polarizing filter for view examining purposes. When the device is to be put away, the member 24 is slid down snugly into the mount 17 until a top-piece 25 attached to the member 24 comes in contact with the upper portion of the mount 17. The top-piece 25 includes a small opening 26 which serves as a handle for the member 24 and also as a convenient means by which the device may be suspended, such as from a watch chain for carrying.

I have shown a few of the forms which the invention may take, but it is to be understood that the principle thereof is not confined to the specific structures shown, but is of the scope of the appended claims.

What I claim and wish to secure by Letters Patent of the United States is:

1. A light filter for cameras including a polarizing screen, means including a rotatable part for attaching the screen to the mount of an objective rotatably approximately about and in a plane normal to the optic axis of the objective through which an exposure is to be made and a view-examiner polarizer carried by said rotatable part and spaced from the screen beyond the position occupied by the objective mount when the screen is attached thereto, said view-examiner polarizer and screen having their vibration axes parallel and being adapted to be simultaneously rotated about the optic axis of the objective whereby the effect of said screen can be visually determined by viewing through the view-examiner polarizer, the scene to be photographed.

2. A light filter for cameras including a polarizing screen, means for rotatably attaching the screen to an objective through which an exposure is to be made, an indicator member on said means and oriented in pre-determined relation to the vibration axis of said polarizing screen, and a view examiner polarizer carried in a mount having guiding means oriented in pre-determined relation to the vibration axis of said view examiner polarizer, and means for securing said mount to said screen attaching means, said guiding means cooperating with said indicator member in determining the orientation of said view examiner polarizer to insure that the vibration axis is parallel to the vibration axis of said screen, whereby the effect of the screen can be visually determined by viewing through said polarizer carried to one side of the polarizing screen, the scene to be photographed.

3. In apparatus of the character described, the combination of a polarizing screen having mounting means at least part of which is rotatable for attaching the screen to the mount of a camera objective rotatably about and in a plane normal to the optic axis of the objective and a view-examiner polarizer detachably and rigidly secured to and spaced laterally from said rotatable part and from the position occupied by the objective mount when the screen is attached thereto, said polarizer and said screen being oriented with their vibration axes parallel whereby the effect of the screen can be visually determinated by viewing through said polarizer.

4. A device of the character described comprising in combination, a polarizing filter rotatably mounted on a camera lens, a member on the filter mount positioned in predetermined relation to the vibration axis of said filter for indicating the orientation of said axis, a view-examiner polarizer having a mount, and means on the polarizer mount oriented in predetermined relation to the vibration axis of the polarizer for engaging the indicator member of the filter mount and for rigidly securing the polarizer mount to the filter mount, the orientation of said engaging and securing means with respect to the vibration axis of the polarizer being the same as the orientation of the indicator member with respect to the vibration axis of the filter whereby said vibration axes are parallel.

5. A polarizing light filter, adapted for use with a camera, comprising two portions of light-polarizing material, a mount for one of said portions, attaching means for rotatably attaching said mount to the camera lens, a mount for the other of said portions laterally spaced from the first mentioned mount, and means rigidly coupling said mounts, said coupling means and said mounts being so arranged with respect to said portions that the vibration axes of said portions are parallel, whereby said other portion rotates about the camera lens when the first portion is rotated in front of the camera lens.

DONALD A. FARMEN.